May 10, 1960 P. H. BINDEL 2,936,111
SIGNALLING SYSTEM
Filed July 10, 1956 6 Sheets-Sheet 1

INVENTOR.
Paul H. Bindel
BY
Smith, Olsen, Baird & Miller
Attys.

May 10, 1960 P. H. BINDEL 2,936,111
SIGNALLING SYSTEM
Filed July 10, 1956 6 Sheets-Sheet 3

INVENTOR.
Paul H. Bindel
BY
Smith, Olsen, Baird & Miller
Attys.

May 10, 1960 P. H. BINDEL 2,936,111
SIGNALLING SYSTEM
Filed July 10, 1956 6 Sheets-Sheet 4

FIG. 5

INVENTOR.
Paul H. Bindel
BY
*Smith, Olsen, Baird & Miller*
Attys.

May 10, 1960

P. H. BINDEL 2,936,111

SIGNALLING SYSTEM

Filed July 10, 1956

INVENTOR.
Paul H. Bindel

BY

*Smith, Olsen, Baird & Miller*

Attys.

FIG. 8

United States Patent Office 2,936,111
Patented May 10, 1960

2,936,111

SIGNALLING SYSTEM

Paul H. Bindel, Chicago, Ill.

Application July 10, 1956, Serial No. 596,952

8 Claims. (Cl. 235—23)

The present invention relates to a signalling system and more particularly to a signalling system that is controlled in accordance with characters registered in a business machine.

One of the general objects of the invention is to provide a signalling system for disseminating business information, wherein the system is capable of registering both numerical information and coded alphabetical information and utilizing that information to control the operation of remote registers in the system for any of a great variety of purposes. Still another object of the invention is to provide a signalling system of the kind just stated, incorporating a business machine of the type disclosed in my U.S. Patent No. 2,727,690, wherein the machine is capable of registering any one of a plurality of individual series of digits and also capable of coding and registering alphabetical characters in numerical translation.

As will become more apparent later, the present signalling system may have a great variety of uses in business, particularly where a great volume of information is being handled or must be made available on short notice. For example, in filing systems of any kind where a separate file is maintained for each of a great number of persons, the present signalling system is ideally suited for ordering down a particular file at a moment's notice. The particular scheme for establishing a code designation for each file may vary, but with the present signalling system one desirable way is to have a number for each file, that number being the sum of a plurality of digits each of which bears a definite relation to certain information peculiar to the individual person to whom the file relates. This information may include the person's name, his address, his birth date and other factors pertinent to his identification. For example, each letter of the alphabet may be arbitrarily assigned a number. When the file of a particular person is desired, keys corresponding to the letters of the alphabet in the person's name may be operated in the present device to register in the system the code digits corresponding to those letters and, where desired, additional information such as the person's address, birth date, etc., may likewise be registered in the system by the operation of suitable keys. When the pertinent information has thus been registered the sum of the registered digits and code digits is made within the system and circuitry corresponding to that sum is energized to operate an electrical device which, if desired, may automatically send to the operator the file corresponding to the energized device, that file being the file on the person whose name, address, etc. was initially registered in the system.

It will be apparent to those skilled in the art that the signalling system of the present invention is subject to many other uses and applications such as in banks, in connection with telephone systems, and in connection with stock exchanges and commercial marketing transactions. In commercial marketing procedure, for example, the market quotation system is relied upon for information regarding current prices of products at various market locations in a large geographic area. This market information is calculated from trading volumes and prices, generally on calculator type business machines, and then disseminated to the market locations in the geographic area. It is often desirable that the information so prepared should be held confidential during the course of its dissemination to the market locations and therefore at least a portion of the market information, such, for example, as the identity or name of the product, should be coded. The present signalling system is ideally suited for use in this connection.

A more specific object of the invention is to provide a signalling system incorporating a business machine of the type described in the above mentioned patent capable of registering any one of a plurality of individual series of digits and including a remote register provided with a plurality of electrical devices corresponding to the plurality of series of digits and control apparatus for selectively operating the electrical devices in accordance with an individual series of digits registered in the business machine.

A further object of the invention is to provide a signalling system including a calculator business machine having a main numerical keyboard and an auxiliary alphabetical keyboard, wherein the main numerical keyboard is operative independently of or from the auxiliary alphabetical keyboard to register a plurality of series of digits in the business machine, a remote register including a plurality of electrical devices corresponding to the plurality of series of digits registerable in the machine, and control apparatus normally responsive to the registration of a series of digits in the machine for operating the corresponding electrical device, and which control apparatus is further responsive to the operation of any one of the auxiliary keys for preventing the operation of any of said electrical devices until a calculation is made by the machine from the digits so registered therein.

A further object of the invention is to provide a signalling system as described above wherein the control apparatus is further responsive to the registration of a series of digits for rendering a visual indication at the business machine therein of the registered series of digits.

Further features of the invention pertain to the particular arrangement of the elements of the combination whereby the above defined and additional operating features are obtained.

The invention both as to organization and method of operation, together with further objects and advantages thereof, will be best understood by reference to the following specification taken in connection with the accompanying drawings in which.

Figure 1:
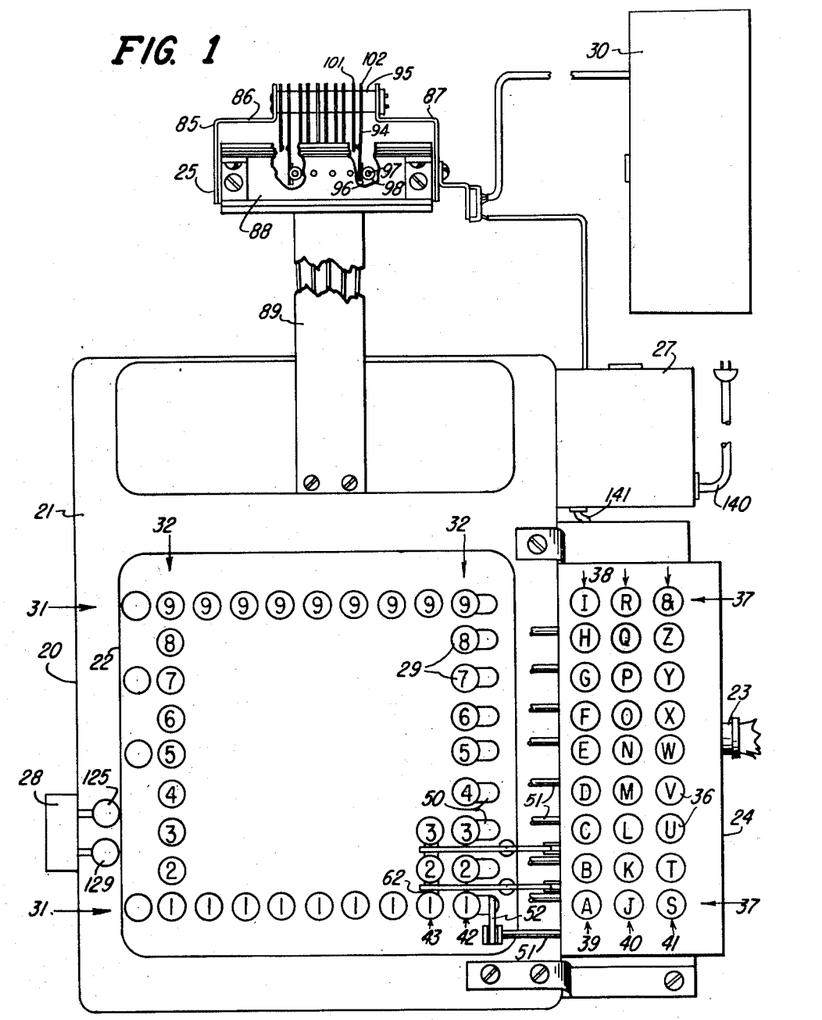
Fig. 1 shows a signalling system in accordance with the present invention, including a plan view of the business machine arrangement thereof and a representation in block schematic form of a remote register and a control circuit included therein.
Figure 2:
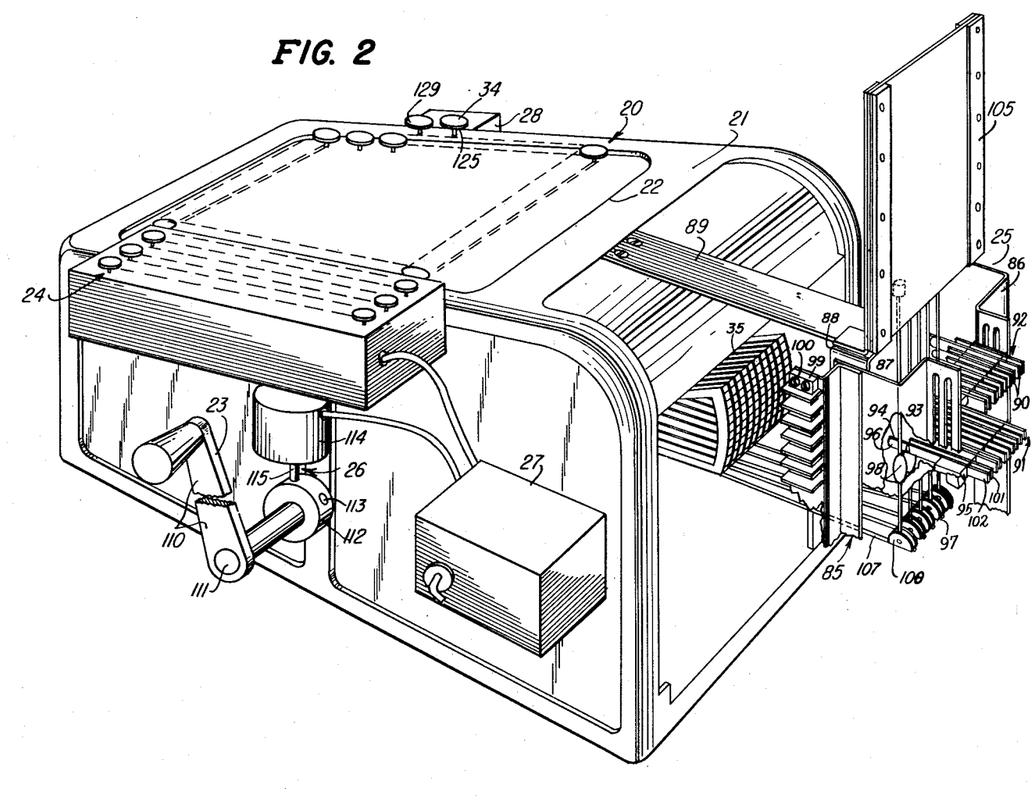
Fig. 2 is a perspective view of the business machine arrangement of the invention, showing a business machine having a main keyboard and an auxiliary keyboard attached thereto and a register-selector including a bank of contacts and a plurality of push rods positioned therein and operable from the business machine for selectively closing the contacts.

Referring now to Figs. 1 and 2, the arrangement there illustrated and embodying the features of the present invention comprises a business machine 20 and a remote register unit 30. The business machine 20 has a frame 21 carrying thereon a main keyboard 22, a register lever 23, an auxiliary keyboard 24, a primary numerical register-selector 25 operable from the business machine, a register lever locking arrangement 26, a control box 27 and a key switch box 28.

Figure 6:
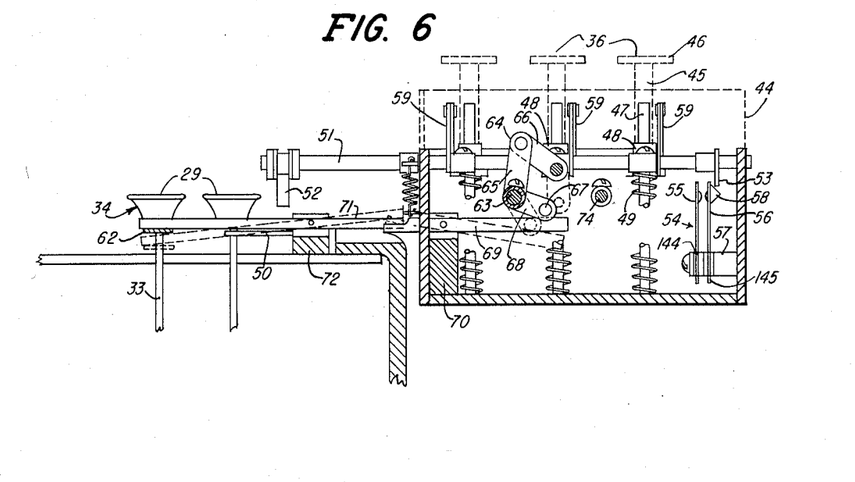
Fig. 6 is an enlarged fragmentary view in cross-sectional elevation taken substantially along the lines 6—6 of Fig. 5, and showing more particularly a portion of the means interconnecting the second file of auxiliary keys with the main keyboard.

With specific regard to the elements of the business machine 20, the main keyboard 22 thereof may be that of any conventional business machine, and is disclosed herein, for purposes of easier understanding, as a conventional adding machine such, for example. as an ordinary mechanical adding machine of the type manufactured in the past by the Burroughs Corporation, of Detroit, Michigan. The keyboard includes a plurality of depressible and automatically retractable main keys 29 arranged in coordinate parallel ranks 31 and llse 32, each file consisting of keys corresponding to the digits 1 through 9, inclusive, arranged in progressive numerical order from the front of the machine to the rear thereof. As best illustrated in Fig. 6, each main key 29 is constructed in a conventional manner and embodies a rectangular stem 33 formed to receive thereon a detachable numbered finger cap 34. Normally the business machine has the digit "0" automatically entered therein for each of the files of keys, and any one of the main keys 29 in each of the files is operative when depressed to cancel the automatically entered digit "0" and to enter into the machine in its place the corresponding one of the digits carried by the depressed key.

Additionally, the business machine 20, as illustrated by the cut-away portion of Fig. 2 includes the usual group of numerical printing faces 35 respectively corresponding to the files 32 of main keys on the keyboard 22, each numerical printing face including thereon the digits 0 through 9, inclusive, arranged in progressive numerical order from the top of the numerical printing face to the bottom thereof. Each numerical printing face is controlled, as in the usual mechanical adding machine, from the corresponding file of main keys on the keyboard 22 in accordance with the one digit entered thereby into the machine so that when the register lever 23 is operated into its operate position, the individual numerical printing faces are selectively raised in a vertical direction to a common horizontal level so that the digits of the printing faces in the common horizontal level correspond to the digits entered into the machine. Thereafter, as in all such mechanical adding machines, when the register lever 23 is released and restores to its normal position the depressed ones of the main keys 29 are automatically reset and the numerical printing faces 35 are restored to their normal position, whereby the machine is cleared and again ready to record a new group of numbers.

Further, the business machine includes the auxiliary keyboard 24 attached to the frame 21 and including a plurality of auxiliary keys 36 arranged in coordinate ranks 37 and files 38; each of the ranks 37 corresponding to one of the ranks 31 of the main keyboard 22 and being substantially aligned therewith. Each of the three files 38 of auxiliary keys respectively corresponds to a series of letters arranged in alphabetical order from the front of the machine to the rear thereof, the first file 39 including the letters "A" to "I," inclusive, the second file 40 including the letters "J" to "R," inclusive, and the third file 41 including the letters "S" to "Z," inclusive, the last key in the third file being adapted for receiving any suitable symbol such as "&."

The business machine 20 in the present instance further comprises means for connecting the auxiliary keys 36 and certain of the main keys 29 in a manner so as to accommodate selective operation of each main key alternatively independently of the auxiliary keys 36 or directly in response to control from any of the auxiliary keys 36 so as to enter representative numbers into the machine; in the latter instance each representative number has a position in a numerical series corresponding to the position of the represented letter in the alphabetic series. More specifically, the arrangement of the connecting means is such that depression of any individual auxiliary key "A" to "I," inclusive, in the first file 39 of auxiliary keys causes depression of the individual main key in the same rank of the first file 42 of main keys, whereby the letters "A" to "I," inclusive, may be entered into the business machine 20 by the representative numbers 1 to 9, inclusive, respectively. Also, depression of any individual key "J" to "R," inclusive, in the second file 40 of auxiliary keys, causes depression of the individual main key in the same rank in the first file 42 of main keys and in addition causes depression of the first (digit 1) key in the second file 43 of main keys, whereby the letters "J" to "R," inclusive, may be entered into the business machine 20 by the representative numbers 11 to 19, inclusive, respectively. Finally, depression of any individual auxiliary key "S" to "&," inclusive, in the third file 41 of auxiliary keys causes depression of the individual main key in the same rank in the first file 42 of main keys and in addition causes depression of the second (digit 2) key in the second file 43 of main keys, whereby the letters "S" to "Z" and the symbol "&," inclusive, may be entered into the machine by the representative numbers 21 to 29, inclusive, respectively.

In view of this general description of the business machine, it will be understood that an operator may use the main keys 29 independently of the auxiliary keys 36 for tabulating numerical data and enter that data into the business machine 20; in addition, an operator may use the auxiliary keys 36 to translate an accumulation of lettered information which may be an alphabetical code or the name of a person, a product or an account, into a numerical code by depressing the auxiliary lettered keys corresponding to the accumulation of letters, thereby entering into the machine a numerical code corresponding to the selected lettered keys on the auxiliary keyboard 24.

Figure 5:
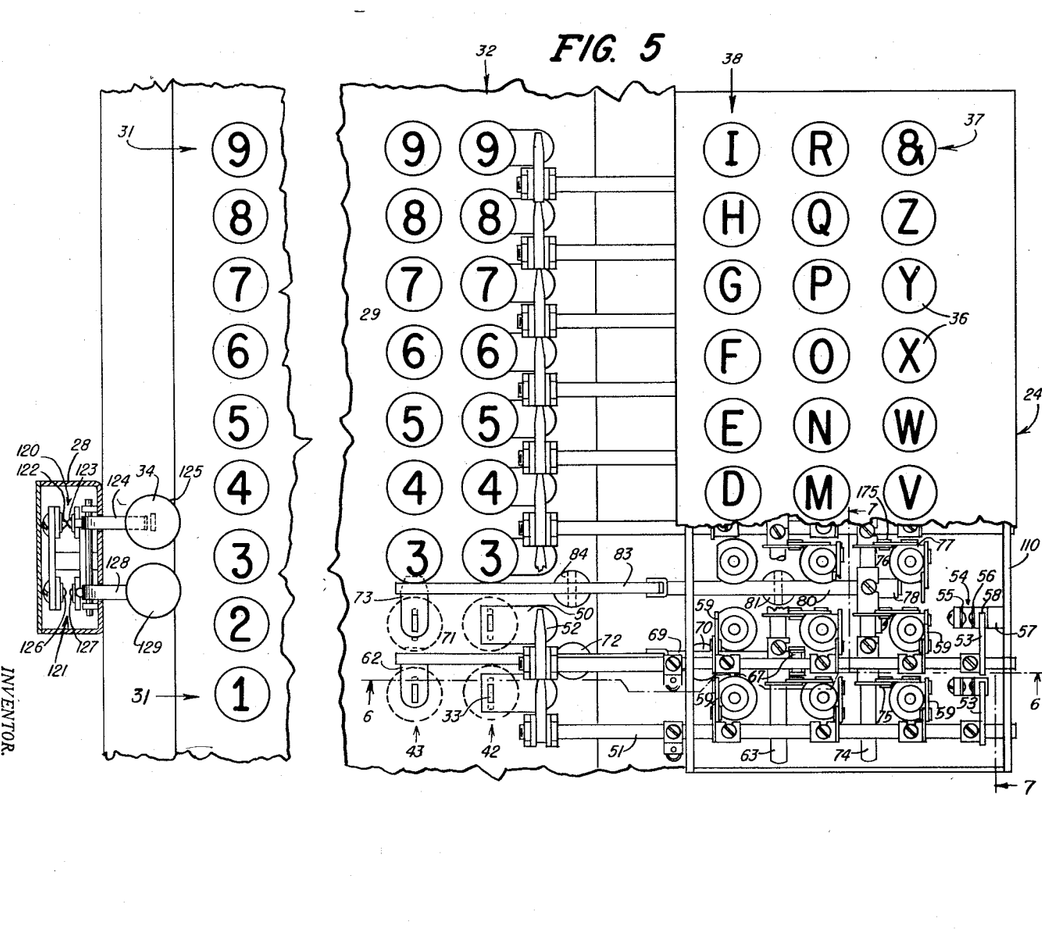
Fig. 5 is an enlarged fragmentary plan view of the business machine with portions broken away to illustrate more clearly the mechanism interconnecting the keys of the auxiliary keyboard with certain keys of the main keyboard.
Figure 7:
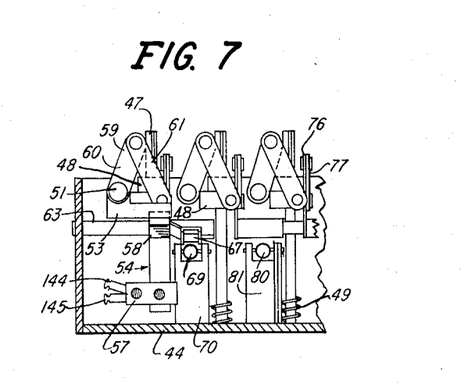
Fig. 7 is an enlarged fragmentary view in cross-sectional elevation taken substantially along the lines 7—7 of Fig. 5, showing a portion of the mechanism for interconnecting the third file of auxiliary keys and the second key in the second file of main keys, and showing in addition a portion of the means interconnecting the third file of auxiliary keys and first file of main keys and a contact set in operative position by the disclosed mechanism.

Referring now more specifically to the means for connecting the keys of the main keyboard 22 and the auxiliary keyboard 24, the mechanism for accommodating selective operation of the main keys 35 is shown in detail in Figs. 5, 6 and 7 and is substantially identical to the structure and arrangement of mechanism disclosed in P. H. Bindel Patent No. 2,727,690, issued December 20, 1955.

The auxiliary keyboard 24 comprises a box-like, rectangular casing 44 supporting therein the auxiliary keys 36. The last mentioned keys are substantially identical in structure, comprising a tubular portion 45 (Fig. 6) carrying thereon a lettered finger cap 46 and telescopically engaging a corresponding upstanding stem 47 secured to the bottom wall of the casing 44. The stem 47 carries thereon in contact with the tubular portion 45 a slidable collar 48 which is normally biased in an upper position by a coiled spring 49 that is positioned around the stem 47 between the bottom wall of the casing 44 and the slidable collar 48. When the auxiliary key is depressed the tubular portion 45 thereof is operated against the collar 48 thereby causing the collar to be depressed.

On the main keyboard 22 the main keys 29 accommodate selective operation thereof alternatively independently of the auxiliary keys 36 or in direct response to control from one of the auxiliary keys in the first file 39 of auxiliary keys. As shown by Figs. 5 and 6, each main key in the first file 42 of main keys is provided with a detachable cam plate 50 fitted securely to the stem thereof and disposed in a direction toward the auxiliary keyboard 24 and adapted to be depressively engaged by a cam finger, as described hereinafter.

Each rank 37 of auxiliary keys in the auxiliary keyboard 24 is provided with a longitudinally extending cam shaft 51 rotatably mounted between the sidewalls of the casing 44 and extending beyond the casing in a direction towards and in close proximity to the cam plate 50 of the one of the main keys in the file 32 on the main keyboard 22 corresponding thereto in rank. Carried on the end of each cam shaft 51 and in close proximity to the corresponding cam plate is a cam finger 52 rigidly secured thereto and positioned to overlie the corresponding cam plate so that when the cam shaft is rotated clockwise (as viewed from Fig. 7) the cam finger 52 thereof engages the corresponding cam plate 50 and depresses the associated main key 36 in the first file 42 of main keys. Positioned at the other end of each of the cam shafts 51 and within the confines of the casing 44 is another cam finger 53 rigidly secured to the cam shaft 51 and rotatable therewith. In close proximity to each of the cam fingers 53 is a set of contacts 54 comprising a conductive contact spring 55 terminated in a terminal 144 and a flexible conductive make spring 56 terminated in a terminal 145, both springs being mounted at their terminal ends in spaced-apart relation on an insulator block 57 which in turn is secured to the side wall of the casing 44. The make spring 56 includes a cam face 58 thereon which is positioned for engagement with the corresponding cam finger 53, whereby the springs 55 and 56 are closed in response to the clockwise rotation of the cam shaft 51. Accordingly, in response to clockwise rotation of any one of the cam shafts 51 the associated main key in the file 42 of main keys is depressed and the associated set of contacts 54 is closed.

The mechanism for rotating each of the cam shafts 51 is a lost motion connection 59, best illustrated in Fig. 7, that is connected between the cam shaft and each of the slidable collars 48 for the corresponding rank 37 of auxiliary keys. The construction of the lost motion connections is described in detail in the previously mentioned P. H. Bindel patent and each comprises essentially a pair of lever arms 60 and 61 that are pivotally joined at one end thereof and whereof the other end of the lever arm 60 is secured to the corresponding cam shaft 51 in a manner so as to impart clockwise rotation thereto in response to clockwise rotation thereof, without being rotated when the cam shaft 51 is independently rotated in the clockwise direction, and whereof the other end of the lever arm 61 is pivotally connected to the associated slidable collar 48 so that when the slidable collar 48 is depressed the lever arm 60 is pulled down thereby exerting a downward force on the lever arm 60 and imparting a clockwise rotary motion to the lever 60 and to the connected cam shaft 51.

In view of the foregoing, it will be understood that depression of any key in the first file 39 of auxiliary keys causes depression of the collar 48 associated therewith and imparts clockwise rotation to a respective cam shaft 51 whereby the associated finger 52 is swung into engagement with and depresses the cam plate 50 and associated main key in the same rank in the first file 42 of keys in the main keyboard. Accordingly, the first auxiliary file of keys including the letters "A" to "I," inclusive, may be entered into the adding machine by a series of representative numbers 1 to 9, inclusive, respectively, each number having a position in the series corresponding to the alphabetic position of the represented letter.

The invention further comprises mechanism accommodating selective operation of the main keys 29 independently of the auxiliary keys 36 and responsive to the operation of any individual key in the second file of auxiliary keys "J" to "R," inclusive, for operating simultaneously the individual main key in the same rank in the first file 42 of main keys and also the first key (digit No. 1) in the second file 43 of main keys.

As best shown in Figs. 5, 6 and 7, each auxiliary key in the second file 40 of auxiliary keys is connected by an associated lost motion connection 59 to the same cam shaft 51 as is operated by the auxiliary key in the same rank in the first file 39 of auxiliary keys. Thus, depression of any one of the individual auxiliary keys in the second file 40 of auxiliary keys operates to rotate the particular associated cam shaft 51 independently of the auxiliary key in the first file 39 of auxiliary keys that is also connected to the same shaft 51.

Further, as shown in Figs. 1, 5 and 6, the first key, or digit No. 1 key, in the second file 43 of main keys is provided with a cam plate 62 which is detachably assembled with the particular main key stem 33 in the same manner as the cam plates 50 are assembled in the first file 42 of main keys, the cam plate 62 having a portion disposed rearwardly between the first and second ranks 31 of main keys for depressing engagement by a lever, as will be described hereinafter.

Finally, the interconnecting mechanism comprises a cam shaft and link arrangement whereby depression of any individual key in the second file 40 of auxiliary keys operates to depress the cam plate 62 and the digit 1 key in the second file 43 of main keys. As best shown in Fig. 5, a cam shaft 63 is disposed longitudinally between the first file 39 and the second file 40 of auxiliary keys and is supported for rotation at the opposite end walls of the casing 44. Each key in the second file 40 of auxiliary keys is connected to the shaft 63 by a lost motion connection 64 (Fig. 6) of construction substantially identical to that of the lost motion connections 59 and being operative upon depression of any individual key in the second file 40 of auxiliary keys for rotating the shaft 63 in a clockwise direction (viewed from the front of the business machine 20, as in Fig. 6). Each lost motion connection 64 comprises essentially a pair of lever arms 65 and 66 that are pivotally joined at one end thereof and whereof the other end of the lever arm 65 is secured to the corresponding cam shaft 63 in a manner as is described in detail in the previously mentioned P. H. Bindel patent so as to impart clockwise rotation thereto in response to the clockwise rotation thereof, without being rotated when the cam shaft 63 is independently rotated in the clockwise direction, and whereof the other end of the lever arm 66 is pivotally connected to the associated slidable collar 48 so that when the slidable collar 48 is depressed the lever arm 66 is pulled down thereby exerting a downward force on the lever arm 65 and imparting a clockwise rotary motion to the lever 65 and the connected cam shaft 63. Also, the cam shaft 63 carries thereon a yoke and roller 67, which is fixed to the cam shaft 63 by an arm 68 and is disposed between the first and the second ranks of auxiliary keys for rotary motion between a normal elevated position (as shown by the solid lines in Fig. 6) and a lower operated position (as shown by the dotted lines in Fig. 6) in order to actuate link mechanism communicating with the cam plate 62 for depressing the digit 1 key in the second file 43 of main keys.

The link mechanism comprises a first lever 69 disposed between the first and second ranks of auxiliary keys and pivotally mounted to a stud 70 carried by the bottom wall of the casing 44. The right-hand end of the lever 69 underlies the roller 67 and is arranged to be depressed when the roller is in its lower operated position. The left-hand end of the lever 69 extends beyond the side wall of the casing 44 and engages the underside of the right hand end of a second lever 71, which second lever is longitudinally disposed with respect to the first lever 69. Also, the second lever 71 is pivotally mounted to a stud 72 on the frame 21, the left-hand end of the lever 71 overlying and resting on the cam plate 62 of the associated digit No. 1 key in the second file 43 of main keys so that the digit No. 1 key is depressed when the roller 67 is in its lower operated position.

In view of the foregoing it is understood that depression of any key in the second file 40 of auxiliary keys causes depression of a collar 48 associated therewith and imparts clockwise rotation to the associated cam shaft 51 whereby the associated cam finger 52 engages and depresses the cam plate 50 and the associated main key in the same rank in the first file 42 of main keys. Simultaneously, depression of the collar 48 imparts clockwise rotation to the cam shaft 63 whereby the roller 67 is rotated into its lower operated position, depressing the right-hand end of lever 69 which causes depression of the left-hand end of the lever 71, the cam plate 62 and the digit No. 1 key in the second file 43 of main keys. Accordingly, the second auxiliary file of keys including the letters "J" to "R," inclusive, may be entered into the adding machine by the series of representative numbers 11 to 19, inclusive, respectively, each number having a position in the series corresponding to the alphabetic position of the represented number.

The invention further comprises mechanism accommodating selective operation of the main keys 29 independently of the auxiliary keys 36 and responsive to the operation of any individual key in the third file of auxiliary keys "S" to "Z" and the symbol "&," inclusive, for operating simultaneously the individual main key in the same rank in the first file 42 of main keys and also the second key (digit No. 2 key) in the second file 43 of main keys. As best shown in Fig. 5, each auxiliary key in the third file 41 of auxiliary keys is connected by a lost motion connection 49 to the same cam shaft 51 as is operated by the auxiliary keys in the same rank in the first file 39 and in the second file 40 of auxiliary keys. The depression of any individual auxiliary key in the third file 41 of auxiliary keys operates to rotate the particular associated cam shaft 51 independently of the auxiliary key in the first file 39 and in the second file 40 which is similarly connected to the same shaft 51.

Further, as best shown in Fig. 5, the second key or digit No. 2 key in the second file 43 of main keys is provided with a cam plate 73 that is substantially identical to and is assembled to particular main key stem 33 in the same manner as is the cam plate 62, the cam plate 73 having a portion rearwardly disposed between the second and third ranks of main keys for depressing engagement by a lever as is described hereinafter.

The interconnecting mechanism between the cam plate 73 and auxiliary keyboard comprises a cam shaft and link arrangement whereby depression of any individual key in the third file 41 of auxiliary keys operates to depress the cam plate 73 and the digit No. 2 key in the second file 43 of main keys. This cam plate and link mechanism is substantially identical to the cam shaft 63 and link mechanism therefor operative from the second file 40 of auxiliary keys, previously described, and embodies substantially the same parts having substantially the same functions. Specifically, and as best shown in Fig. 5, a cam shaft 74 is longitudinally disposed between the second file 40 and the third file 41 of auxiliary keys and is supported for rotation at the end plates of the casing 44. Each key in the third file 41 of auxiliary keys is connected to the shaft 74 by a lost motion connection 75 which is substantially identical to the lost motion 64 including a lever arm 76 and a lever arm 77, corresponding respectively to the lever arms 65 and 66, and a yoke and roller 78, corresponding to the yoke and roller 67. The lost motion connection 75 is operative upon depression of any individual key in the third file 41 of auxiliary keys for rotating the shaft 74 in a clockwise direction (as viewed in Fig. 6). The yoke and roller 78 thereof is operative between a normal elevated position and a lower operated position in the same manner as the yoke and roller 67 in order to actuate link mechanism communicating with the cam plate 73 for depressing the digit No. 2 key in the second file 43 of main keys. The link mechanism comprises a first lever 80 pivotally mounted to a stud 81 carried on the bottom wall of the casing 44. The right-hand end of the lever 80 underlies the roller 78 and is arranged to be depressed when the roller is in its lower operated position. The left-hand end of the lever 80 engages the underside of the right-hand end of a second lever 83 which second lever is longitudinally disposed with respect to the lever 80 and is pivotally mounted to a stud 84 carried on the frame 21, the left-hand end of the lever 83 overlying and resting on the cam plate 73 for depressing the cam plate and the associated digit No. 2 key in the second file 43 of main keys when the roller 78 is in the lower operated position.

In view of the foregoing it will be understood that depression of any key in the third file 41 of auxiliary keys causes depression of a collar 48 associated therewith and imparts clockwise motion to an associated cam shaft 51 whereby a cam finger 52 connected thereto engages and depresses a cam plate 50 and an associated main key in the same rank in the first file 42 of main keys. Simultaneously, depression of the collar 48 imparts clockwise rotation to the cam shaft 74, whereby the roller 78 is operated into its lower position for depressing the right-hand end of the lever 80 which causes depression of the left-hand end of the lever 83, the cam plate 73 and the digit No. 2 key in the second file 43 of main keys. Accordingly, the third auxiliary file of keys including the letters "S" to "Z" and the symbol "&," inclusive, may be entered into the adding machine by a series of representative numbers 21, 29, inclusive, respectively, each number having a position in the series corresponding to the alphabetical position of the represented letter.

Considering now the primary numerical register-selector 25, there is provided a frame 85, including side panels 86 and 87 and a top panel 88, the frame 85 of the register-selector 25 being secured to the frame 21 of the business machine 20 at the top panel 88 by a bracket 89. Supported within the frame 85 is a plurality of sets of electric contacts 90 arranged in ranks 91 and files 92, each file 92 of contact sets corresponding to a one of the files 32 of keys on the main keyboard 22, and the contact sets 90 in each file individually corresponding to the digits 0 to 9, inclusive, and arranged in progressive numerical order from the bottom of the register-selector 25 to the top thereof. For simplicity in illustration, only a portion of the total number of contacts 90 are shown. As best seen in Fig. 2, each contact set includes a conductive contact spring 93 terminated in a terminal 101 and flexible conductive make spring 94 terminated in a terminal 102, both of the springs being secured at their terminal ends and in spaced apart relationship, on an insulator block 95, which is common to all of the contact sets in the same rank 91 of contact sets and is supported between the side panels 86 and 87 of the frame 85. The make spring 94 of each contact set carries on its other end a bearing surface 96. Each of the files 92 of contact sets has associated therewith a vertical upstanding push rod 97 that is slidably supported at its upper extremity by apertures in the top panel 88 and carried in close proximity to and alignment with the bearing surfaces 96. Each push rod carries thereon near its lower end a cam ball 98 positioned so that as the push rod is raised vertically the cam ball 98 engages and bears against the bearing surfaces 96 in the associated file 92. In the course of vertical movement the cam ball successively comes into horizontal alignment with the contact sets corresponding rsepectively to the digits 0 through 9, inclusive, so that any one of the contact sets in a file 92 may be closed by lifting the cam ball of the associated push rod 97 to the corresponding level. In addition to this arrangement the frame 85 carries on the side panel 87 thereof a terminal block 99, including a plurality of terminals 100, corresponding in number to the contact sets therein, for facilitating interconnections between the contact sets 90, the control box 27 and the remote register 30; and the frame 85 carries on the top panel 88, projecting upwardly and rearwardly with respect to the push rods 97 an indicator card 105. The indicator card 105 has imprinted thereon vertical files 106 of numbers corresponding to the push rods 97 and in alignment therewith, each number file 106 including the digits 0 to 9, inclusive, arranged in progressive numerical order from the bottom of the card to the top thereof and spaced so that as the associated push rod and cam ball are raised to a one of the numerically ordered contact sets in the associated file 92 of contact sets, the top of the push rod 97, acting as a pointer, indicates on the indicator card 105 the one of the contact sets in the associated file that is closed.

Further, the invention comprises linking mechanism between the business machine 20 and the register-selector 25. Specifically, the numerical printing faces 35 have connected thereto rearwardly extending lift rods 107 which are raised and lowered in vertical arcs in accordance with the raising and lowering of the individually associated numerical printing faces. At its free end each of the lift rods carry a hinge 108 which pivotally supports a corresponding push rod 97 at its lower end so that as a numerical printing face is raised from its normal position the connected lift rod 107 sweeps upwardly in a vertical arc thereby lifting the associated push rod 97 and cam ball 98 to selectively engage and close the contact sets of the associated file 92 of contact sets. In the present example and as best seen in Fig. 1, the first five numerical printing faces 35 corresponding respectively and consecutively to the files 42, etc., of main keys on the main keyboard have lift rods 107 connected thereto which provide movement for five push rods 97 in the primary numerical register-selector, though it is understood that a fewer or a greater number of printing faces 35 may have lift rods 107 and push rods 97 associated therewith.

In view of the foregoing, it will be understood that the raising of any one of the first five numerical printing faces 35 in the business machine 20 to a level corresponding to a selected one of the digits causes the connected lift rod 107 to be raised correspondingly in a vertical arc thereby lifting the associated push rod 97 and cam ball 98 to the contact set in the associated file 92 corresponding to that of the selected digit. Additionally, the raised push rod 97 acting as a pointer on the indicator card 105 renders, at the corresponding file 106, a visual indication of the digit registered in the business machine 20 and of the one of the contact sets 90 in the corresponding file 92 that is closed.

Figure 8:
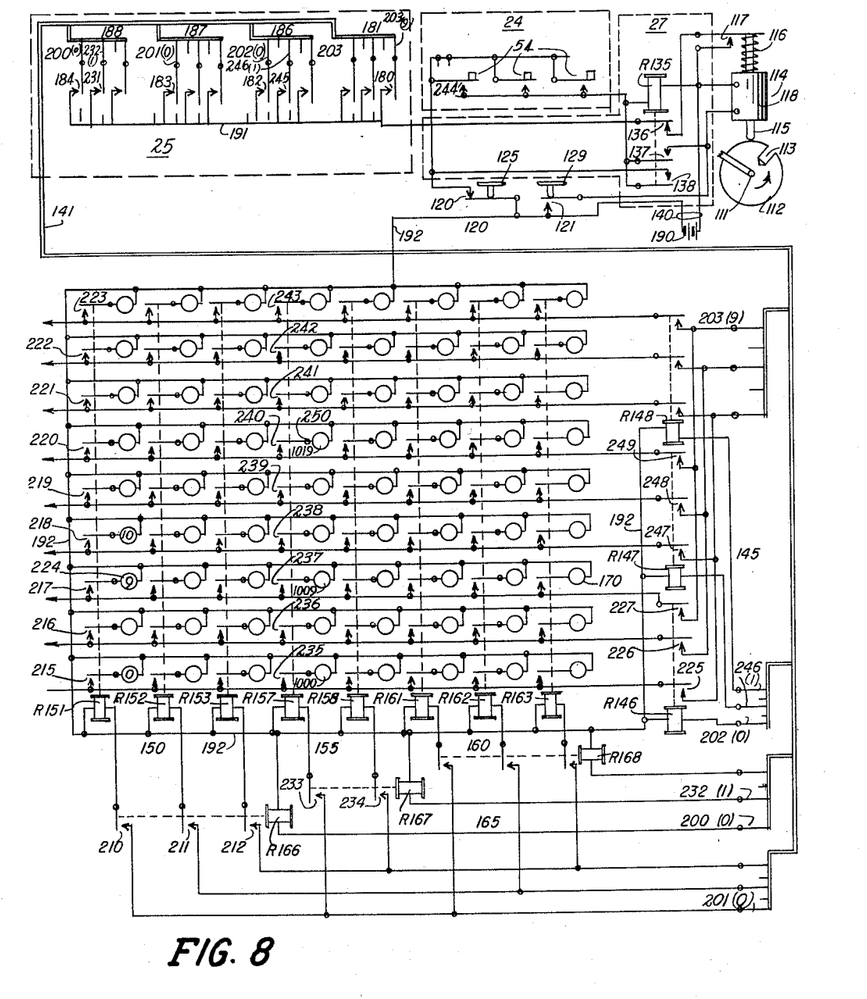
Fig. 8 is a circuit diagram in schematic form of the remote register and the control circuit for operating the same.

Further, the invention comprsies a register lever locking arrangement 26 carried on a side of the frame 21 of the business machine and in close proximity to the register lever 23. As illustrated in Fig. 2, the register lever 23 comprises a handle and lever portion 110 which is secured to a rotatable shaft 111 terminated in the business machine 20. Rigidly secured to the shaft 111 and rotatable therewith is a collar 112 comprising one part of the register lever locking arrangement 26 and having therein a radially extending aperture 113. Further, the locking arrangement includes a spring loaded plunger mechanism 114 including a plunger shaft 115 radially aligned with the rotational axis of the shaft 111. The register lever 23 is spring biased from within the business machine 20 in the manner common to such mechanical adding machines so that under conditions of free movement the lever occupies a normal position wherein the aperture 113 in the collar 112 is displaced from the plunger shaft 115 by a predetermined angular distance, here illustrated in Figs. 1 and 8 as being in a clockwise direction from the plunger shaft 115; and when the lever is in the operated position the aperture 113 and plunger shaft 115 are aligned and the shaft 115 is received in the aperture 113. As best illustrated in Fig. 8, the spring loaded plunger mechanism 114 includes a spring 116 adapted to bias the plunger shaft 115 into contact with the circumferential surface of the collar 112 so that when the collar is rotated and the aperture 113 thereof is aligned with the plunger shaft 115, the latter is extended into the aperture 113 thereby restricting further movement of the collar 112 and the lever 23. In addition the plunger mechanism 114 includes a contact set 117 which is operated from the plunger shaft 115 and is opened when the plunger shaft is in its retracted position and closed when the plunger shaft is in its extended position whereby a circuit is completed for completing control operations as is described hereinafter. Further, the plunger mechanism 114 includes a solenoid coil 118 which is selectively energized from the control box 27 to operate the plunger shaft 115 in a direction to overcome the spring bias of the spring 116, so that when the plunger shaft 115 is in its retracted position and not seated in the aperture 113, energization of the solenoid coil 118 maintains the plunger shaft 115 in its retracted position thereby preventing it from restricting movement of the lever 23, and when the plunger shaft 115 is in its extended position and seated in the aperture 113, energization of the solenoid coil 118 causes the plunger shaft 115 to be withdrawn therefrom into its retracted position, thereby opening the closed contacts 117 and granting freedom of movement to the collar 112 and the lever 23.

Accordingly, it is clear that when the register lever 23 is in its normal position the plunger shaft 115 of the plunger mechanism 114 is in its retracted position and the contacts 117 are opened; when the solenoid coil 118 is deenergized and the register lever 23 is in its operated position the plunger shaft 115 is extended into the aperture 113 thereby restricting further movement of the register lever 23 and closing contacts 117; and thereafter when the solenoid coil 118 is again energized the plunger shaft 115 is withdrawn from the aperture 113 whereby the contacts 117 are opened and the register lever 23 returns to its normal position.

Additionally, the invention comprsies a pair of key switches 120 and 121 which are shown in Fig. 5 as encased in a key switch box 28 affixed to the frame 21 of the business machine 20. The key switch 120 comprises a pair of contacts 122 and 123, which are normally closed, and a lever arm 124 which is pivoted within the switch box 28 and extends beyond the box 28 to underlie the finger cap 34 of a "total key" 125, the latter being the totalizing key on the adding machine 20. When the total key 125 is depressed in order to total any series of numerals entered into the business machine, the lever arm 124 is depressed thereby causing the contacts 122 and 123 to be opened. The key switch 121 comprises a pair of contacts 126 and 127, which are normally opened, and a lever arm 128 which is pivoted within the switch box 28 and extends beyond the box to support a release key 129. When the release key 129 is depressed the contacts 126 and 127 are closed completing a circuit to be described hereinafter.

The invention in its present embodiment comprises in addition the control box 27 which is affixed to the frame 21 of the business machine 20 and includes, as shown in Fig. 8, a relay R135 for selectively opening and closing a group of contacts including contacts 136, 137 and 138. The business machine arrangement is connected to a source of constant current 190 via a line 140 extending to the control box 27 and selectively distributes the current so applied through the register-selector 25, the auxiliary keyboard 24, the key switch box 28, the register lever lock mechanism 26 and the remote register unit 30 in a manner as explained in detail hereinafter.

Finally, the invention comprises the remote register unit 30 which is connected to the primary register-selector 25 by means of a trunk 141 and includes a first group of relays 145 here illustrated as including relays R146, R147 and R148, a second group of relays 150, here illustrated as including only the relays R151, R152 and R153, a third group of relays 155, here illustrated as including only the relays R157 and R158, a fourth group of relays 160, here illustrated as including only the relays R161, R162 and R163, and a fifth group of relays 165, here illustrated as including the relays R166, R167 and R168. In practice, the relay groups 145, 150, 155, 160 and 165 would preferably include ten relays each and are illustrated here as including a fewer number for purposes of easier and more simplified illustration.

Additionally, the remote register unit 30 includes a plurality of electrical devices 170 here illustrated, for purposes of simplicity, as eight files of nine each, though in practice, and assuming that five files 92 of ten contact sets 90 were included in the register-selector 25, the number of electrical devices 170 would be ten thousand, respectively corresponding to the plurality of numbers registerable in the primary numerical register-selector 25. In Fig. 8 the electrical devices 170 are illustrated as, for example, light bulbs, though it is understood that any one of a number of electrical and electro-mechanical devices may be controlled therein.

The invention both as to its mode of operation and structure will be better understood by considering the operation of the signalling system in response to the entering of a number into the machine 30, in one instance directly from the main keyboard 22 and in the other instance from the auxiliary keyboard 24, and registering that number in the machine.

Figure 3:
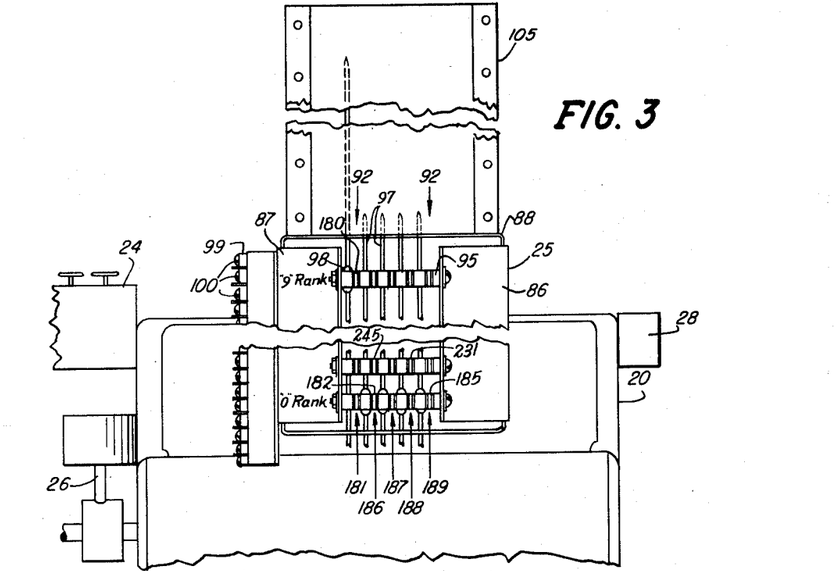
Fig. 3 is a rear elevational view of the register-selector unit of the business machine arrangement, showing an indicator chart therefor and showing indicating push rods displaced from their normal position.
Figure 4:
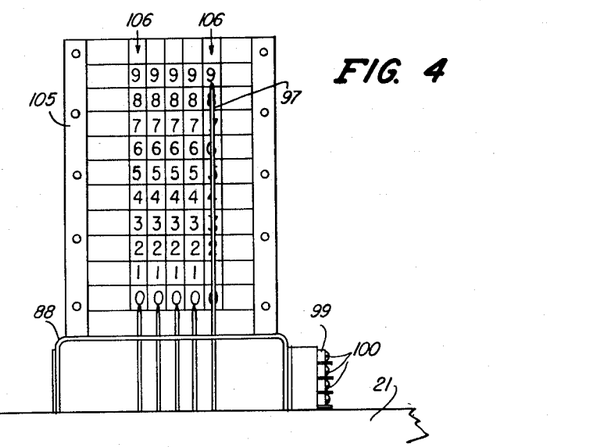
Fig. 4 is a front view of the indicator chart of the register-selector, showing indications marked thereon by the push rods when displaced in accordance with Fig. 3.

Considering now the operation of the signalling system in accordance with the invention and assuming that an operator at the business machine 20 depresses only the ninth key (digit No. 9) in the first file 42 of main keys, the business machine 20 has entered therein for each of the files 32 (reading from right to left in Fig. 2) the digits 9, 0, 0, 0, etc. Thereafter, the operator at the business machine 20 operates the register lever 23 from its normal position into its operate position, whereupon the first one of the numerical printing faces 35 corresponding to the first file 42 of main keys is raised ten positions and the other numerical printing faces 35 are raised one position so that the corresponding lift rods 107 and push rods 97 are raised corresponding amounts in the vertical direction. As the primary numerical register 25 is adapted, in the present illustration, to register only the units, tens, hundredth, thousandths and tenthousandths numbers, the number indicated by the push rods 97 on the indicator card 105 is "00009," as shown in Fig. 4. At this time, as shown in Fig. 3, the contact set 180 in the "9" rank of the first file 181 (reading from left to right) of the files 92 of contact sets is closed and the contact sets 182, 183, 184 and 185 in the "0" rank of the files 186, 187, 188 and 189, respectively, which are the second, third, fourth and fifth files, respectively, of the files 92 of contact sets are closed.

With the register lever 23 operated into its operate position, the plunger shaft 115 of the register lever locking mechanism 26 occupies its extended position in the aperture 113 of the collar 112 whereby the register lever is locked in its operate position and the contacts 117 are closed. Upon closing, the contacts 117 complete a circuit for applying positive potential from the source 190 via the contacts 136 of the control box 27 to a conductor 191 connected in common to all of the contact sets 90 in the primary register-selector 25. The positive potential impressed on the conductor 191 is extended via the closed contacts 184 in the file 188 of contact sets to the conductor 200 (0) which is connected via the trunk 141 to the remote register unit 30 wherein a circuit is completed thereover via the winding of the relay R166 to negative potential on the conductor 192, whereby the relay R166 is operated and the contacts 210, 211 and 212, associated therewith, are closed. Thereupon, a circuit is completed from the positive potential on the conductor 191 via the closed contacts 183 of the file 187 of contact sets in the register-selector 25 to the conductor 201 (0) which is connected via the trunk 141 to the remote register 30 wherein a circuit is completed thereover via contacts 210, the winding of the relay R151 and the conductor 192 to negative potential, whereby the relay R151 is operated and the contacts 215 to 223, inclusive, are closed. At the same time positive potential on the conductor 191 is extended via contacts 182 of the file 186 of contact sets to the conductor 202 (0) which is connected via the trunk 141 to the remote register 30 wherein the conductor 202 (0) is connected via the winding of the relay R146 to the negative potential on the conductor 192, whereby the relay R146 is operated and the contacts 225, 226 and 227 associated therewith are closed. Additionally, positive potential on the conductor 191 is extended via the contacts 180 in the file 181 of contact sets to the conductor 203 (9) which is connected via the trunk 141 to the register-selector 25 wherein the conductor 203 (9) is connected via the contacts 227 and 217 through the lamp 224 of the plurality of lamps 170 to negative potential on the conductor 192, whereby the lamp 224, representing the number "9," is energized and illuminated, thereby indicating at the remote register unit 30 that the number "9" is registered in the primary numerical register 25 by the business machine 20.

The lamp 224 remains illuminated during the period that the register lever 23 is locked in its operated position by the register lever locking mechanism 26. In order to release the register lever 23 so that it will automatically restore to its normal position, the operator at the business machine 20 may depress the release key 129 in the key switch box 28, thereby closing contacts 121 and completing thereat a circuit extending from the positive terminal of the source 190 through the winding of the solenoid coil 118 of the plunger mechanism 114 to the negative terminal of the source 190, thereby energizing the solenoid coil 118 and causing the plunger shaft 115 to be operated into its retracted position, and opening contacts 117 and permitting the register lever 23 to restore to its normal position. Upon opening, the contacts 117 interrupt the circuit for applying positive potential to the conductor 191 in the register-selector 25, whereby the operating circuits for the relays R146, R151 and R166 are interrupted and the latter relays restored so that the contacts closed thereby are opened and the illuminated lamp 224 is extinguished. Upon restoring to its normal position, the register lever 23 resets the operated one of the main keys 29 and causes the numerical printing faces 35 to restore to their normal position, whereby the associated push rods 97 are restored and the contact sets 90 in the register-selector 25 are all opened. Thus, at this time, the business machine 20, the primary numerical register-selector 25, and the remote register 30 are restored to their normal condition and are free to register a new number.

Assuming, now, that the operator of the business machine 20 desires to enter a series of representative numbers into the business machine corresponding to a plurality of alphabetical characters, of which the first alphabetical character is, for example, "I," the operator depresses the "I" character key in the file 39 of keys on the auxiliary keyboard 24, whereby the corresponding cam shaft 51 is rotated and the associated cam finger 52 engages and depresses the cam plate 50 and associated ninth key (digit No. 9) in the first file 42 of main keys. Also, the rotated cam shaft 51 closes, for example, the contact set 244 (Fig. 8) of the group contact sets 54. At this time then the business machine 20 has entered therein for each of the files 32 (reading from right to left in Fig. 2) the representative digits 9, 0, 0, 0, etc. Upon closing, the contacts 244, as shown in Fig. 8, completes a circuit extending from the low voltage terminal of the source 190 via contacts 120 of the total key 125, contacts 244 in the auxiliary keyboard 24, the winding of relay R135 in the control box 27 to the positive terminal of the source 190, whereby the relay R135 is operated. Upon operating, the relay R135 opens at contacts 136 a connection extending to the conductor 191 in the register-selector 25 and closes contacts 137 and 138. The contacts 138, upon closing, complete a circuit by-passing the contacts 244, whereby the relay R135 is maintained operated irrespective of the condition thereafter of the auxiliary board 24, and extends the low potential via contacts 137 through the winding of the solenoid coil 118 to the positive terminal of the source 190, so that the solenoid coil is energized and the plunger shaft 115 is retained in its retracted position.

Thereafter, when the register lever 23 is operated from its normal position to its register position, the first one of the numerical printing faces corresponding to the first file 42 of main keys is raised ten positions and the other numerical printing faces 35 are raised one position so that the corresponding lift rods 107 and push rods 97 are raised corresponding amounts in the vertical direction. Thereupon, and as previously explained, the push rods 97 indicate the number "00009" on the indicator card 105 and the contacts 180, 182, 183, 184 and 185 are closed. However, as the relay R135 is operated and the contacts 136 are opened, positive potential does not appear on the conductor 191, so the closure of these contacts are of no consequence at this time and none of the relays in the remote register 30 are operated. Further, as the energized solenoid coil 118 maintains the plunger shaft 115 in its retracted position, the lever arm 23, upon being released by the operator, is automatically returned to its normal position, the numerical printing faces 35 are restored to their normal position, and the digit No. 9 key in the file 42 of main keys of the alphabetical "I" key in the file 39 of auxiliary keys are both reset, the representative number "9" being retained only in the adding mechanism of the business machine 20.

Now, assuming that the second alphabetical character of the plural alphabetical code is the letter "R," the operator at the auxiliary keyboard 24 depresses the alphabetical "R" key in the file 40 of auxiliary keys causing rotation of the associated cam shaft 51, whereby the associated cam finger 52 is swung into engagement with and depresses the cam plate 50 and the digit No. 9 key in the file 42 of main keys, and also closes the associated contact set 244 of the contact sets 54. Simultaneously, depression of the "R" key imparts clockwise rotation to the cam shaft 63, causing depression of the right-hand end of lever 69 which causes depression of the left-hand end of lever 71, the cam plate 62, and the digit No. 1 key in the second file 43 of main keys. As the relay R135 is operated at this time over the circuit including contacts 138, the closure of contacts 244 are of no further consequence. At this time when the business machine has entered therein for each of the files 32 (reading from right to left in Fig. 2) the digits 9, 1, 0, 0, etc. Thereafter, and in the manner as explained above, when the register lever 23 is operated from its normal position to its register position the number "00019" is indicated by the push rods 97 on the indicator card 105 and the contact set 180 is closed in the first file 181 of contact sets, the contact set 245 is closed in the second file 186 of contact sets, and the contact sets 183, 184 and 185 are closed in the files 187, 188, and 189, respectively. However, as positive potential does not appear on the conductor 191 of the register-selector 25 at this time because the relay R135 is operated, the closure of these contacts is without significance to the remote register 30. Thereafter, and as previously explained, when the register lever 23 is released by the operator it restores to its normal position, the representative number "19" is added to the number "9" retained in the adding mechanism of the business machine 20, the printing faces 35 are returned to their normal positions, and the operated ones of the main keys 29 and the operated ones of the auxiliary keys 36 are reset.

Now, assuming, that the entering and registering of digits in the business machine 20 continues and upon termination thereof the total of the representative numbers retained in the adding mechanism of the business machine 20 is, for example, the number "1019," the operator in order to accumulate the series of representative numbers corresponding to the plurality of alphabetical characters entered therein, depresses the total key 125 of the business machine 20. Thereupon, the contacts of the total switch 120, associated therewith, are opened, whereby the previously traced circuit extending from the negative terminal of the source 190 to the relay R135 and the solenoid coil 118 is interrupted. As none of the contacts 54 in the auxiliary keyboard 24 is closed at this time, the relay R135 restores, thereby closing contacts 136 and opening contacts 137 and 138, and causing the solenoid coil 118 to be deenergized. Thereafter, the operator operates the register lever 23 from its normal position into its operate position in order to register in the business machine 20 the total of the representative numbers retained in the adding mechanism thereof, whereupon the numerical printing faces 35 and the lift rods 107 and push rods 97 are raised accordingly, in a manner as previously explained, so that in the file 181 of contact sets the "9" contact set 180 is closed, in the file 186 of contact sets the "1" contact set 245 is closed, in the file 187 the "0" contact set 183 is closed, in the file 188 the "1" contact set 231 is closed and in the file 189 the "0" contact set 185 is closed; and the number indicated by the push rods 97 on the indicator card 105 is "01019." Also, with the register lever 23 in its operated position, the plunger shaft 115 is extended and seated in the aperture 113 of the collar 112, whereby the contacts 117 are closed in order to apply, in a manner as previously described, positive potential to the conductor 191 of the register-selector 25. Accordingly, positive potential is applied via the contacts 231 of the file 188 and conductor 232 (1) via the trunk 141 to the remote register 30 wherein the relay R167 is operated and the contacts 233 and 234 are closed. At the same time, positive potential is applied from conductor 191 via contacts 183 of the file 187 and conductor 201 (0) over the trunk 141 to the remote register 30, so that the relay R157 is operated thereover via contacts 233. Upon operating the relay R157 closes the group of contacts 235 to 243, inclusive. Further positive potential is applied from conductor 191 via contacts 245 of the file 186 and conductor 246 (1) over trunk 141 to the register 30, whereby the relay R147 is operated and the contacts 247, 248 and 249 are closed. Finally, positive potential is applied from conductor 191 via contacts 180 of the file 181 and the conductor 203 (9) over the trunk 141 to the remote register 30 and, therein, via the contacts 249 and 240 through the lamp 250 to negative potential on the conductor 192, whereby the lamp 250 of the lamps 170, corresponding to the series of representative numbers "1019," is illuminated. The lamp 250 is maintained illuminated during the period that the register lever 23 is locked in its operated position. In a manner as previously described, the operator at the business machine 20 may release the register lever 23 by depressing the spring biased release key 129 and closing for an instant the contacts 121 so that the solenoid coil 118 is energized and the plunger shaft 115 is operated into its retracted position. Thereupon, the contacts 117 are opened causing the illuminated lamp 250 to be extinguished and the register lever 23 to return to its normal position, whereupon the business machine 20 is cleared of all numbers and the numerical printing faces and the connected lift rods 107 and push rods 97 are restored to their normal positions. Accordingly, the business machine 20, the primary numerical register-selector 25 and the remote register 30 are released and restored and ready to register any further numbers therein.

In view of the foregoing, it is apparent that there has been provided in a signalling system a business machine arrangement including a remote register and having a main numerical keyboard similar to that found in a conventional calculating machine and including also a detachable keyboard having a plurality of auxiliary keys each individually representing a letter of the alphabet; the arrangement being such that the keys of the main keyboard are operative independently of the auxiliary keyboard for registering numbers in a remote register, and the keys of the main keyboard may be operated from the auxiliary keys in accordance with a group of letters to enter into the machine a series of representative numbers and whereof there is registered in the remote register only the total of the series of representative numbers so entered therein. Accordingly, the signalling system may be employed, for example, in a market quotation system or elsewhere to transfer confidential information to an operator at a remote quotation board by registering in code at the business machine thereof and at the register of the remote board, for example, the name of the market item, which code is a numerical sum of a series of numbers representing such name and wherein each of the representative numbers has a position in a series corresponding to the alphabetical position of the represented letter; and then for registering at the business machine and at the remote board the tabulated marketing information relating to the identified market item.

While the embodiment of the invention described herein is believed at present to be preferred, it is understood that this embodiment is merely illustrative of the principles of the invention and that various modifications may be made therein; and it is intended to cover in the appended claims all such modifications and variations as lie within the true spirit and scope of the present invention.

What is claimed is:

1. In a signalling system including a business machine provided with a plurality of keys coordinately arranged in M individual ranks and N individual files, a corresponding coordinate arrangement of M different individual characters in each of N individual files, any one key in any one of said N individual files of keys being operative to mark into said machine the one of said individual characters in said one file corresponding to said one key, a register switch manually operative from a normal position to an operate position and automatically operative from said operate position to said normal position, and a primary register means responsive to the marking of any one of said characters into said machine and controlled thereafter by the operation of said register switch from said normal position to said operate position for registering a one of $M^N$ combinations of N individual characters in accordance with the one individual character marked in each of said N individual files of characters and being responsive to the operation of said register switch from said operate position to said normal position for resetting the operated ones of said keys; the combination comprising a secondary register provided with a group of $M^N$ individual registers respectively corresponding to said $M^N$ combinations of N individual characters, means responsive to the registration of one of said $M^N$ combinations of characters in said machine for preparing a circuit to operate the corresponding one of said $M^N$ individual registers, locking means operated in response to the operation of said register switch into said operate position for locking said register switch into said operate position and for completing said prepared circuit, whereby said one individual register is operated, and means operable for restoring said operated locking means, whereby said register switch is operated automatically from said operate position to said normal position and said completed circuit is interrupted.

2. In a signalling system including a business machine provided with a plurality of keys coordinately arranged in M individual ranks and N individual files, a corresponding coordinate arrangement of M different individual characters in each of N individual files, any one key in any one of said N individual files of keys being operative to mark into said machine the one of said individual characters in said one file corresponding to said one key, a register switch manually operative from a normal position to an operate position and automatically operative from said operate position to said normal position, and primary register means responsive to the marking of any one of said characters into said machine and controlled thereafter by the operation of said register switch from said normal position to said operate position for registering a one of $M^N$ combinations of N individual characters in accordance with the one individual character marked in each of said N individual files of characters and being responsive to the operation of said register switch from said operate position to said normal position for resetting the operated ones of said keys; the combination comprising a plurality of contact sets coordinately arranged in M individual ranks and N individual files and respectively corresponding to said M individual characters in each of said N individual files of characters, means responsive to the registeration of one of said $M^N$ combinations of N individual characters in said machine for operating in each of said N individual files of contact sets the one of said contact sets corresponding to the one of said individual characters marked in the corresponding individual files of characters, whereby one combination of $M^N$ combinations of N individual contact sets is operated, a secondary register provided with a group of $M^N$ individual registers respectively corresponding to said $M^N$ combinations of N individual characters, a source of power, switching means responsive to the operation of one of said $M^N$ combinations of N individual contact sets for preparing an operating circuit between said source of power and the corresponding one of said $M^N$ individual registers, locking means operated in response to the operation of said register switch into said operate position for locking said register switch into said operate position and for completing said prepared circuit, whereby said one individual register is operated, and means operable for restoring said operated locking means, whereby said register switch is operated automatically from said operate position to said normal position and said completed circuit is interrupted.

3. The signalling system combination set forth in claim 2, wherein said locking means includes an apertured bearing surface and a plunger carriage carrying thereon a spring biased plunger and a set of plunger operated contacts, whereof said bearing surface is secured to said register switch and is operable therewith between said normal and operate positions and said plunger carriage is mounted in fixed relation to said register switch having said spring biased plunger in bearing contact with said bearing surface so that when said register switch is in said operate position said plunger is extended into an aperture in said bearing surface and said plunger operated contacts are closed, whereby said register switch is locked in said operate position and said one circuit prepared for said one of said individual registers is completed at said plunger operated contacts.

4. In a signalling system including a business machine provided with a plurality of keys coordinately arranged in M individual ranks and N individual files, a corresponding coordinate arrangement of M different individual characters in each of N individual files, any one key in any one of said N individual files of keys being operative to mark into said machine the one of said individual characters in said one file corresponding to said one key, a register switch manually operative from a normal position to an operate position and automatically operative from said operate position to said normal position, and primary register means responsive to the marking of any one of said characters into said machine and controlled thereafter by the operation of said register switch from said normal position to said operate position for registering a one of $M^N$ combinations of N individual characters in accordance with the one individual character marked in each of said N individual files of characters and being responsive to the operation of said register switch from said operate position to said normal position for resetting the operated ones of said keys; the combination comprising a plurality of contact sets coordinately arranged in M individual ranks and N individual files and respectively corresponding to said M individual characters in each of said N individual files of characters, means responsive to the registration of one of said $M^N$ combinations of N individual characters in said machine for operating in each of said N individual files of contact sets the one of said contact sets corresponding to the one of said individual characters marked in the corresponding individual files of characters, whereby one combination of $M^N$ combinations of N individual contact sets is operated, a secondary register provided with a group of $M^N$ individual registers respectively corresponding to said $M^N$ combinations of N individual characters, a source of power, switching means responsive to the operation of one of said $M^N$ combinations of N individual contact sets for preparing an operating circuit between said source of power and the corresponding one of said $M^N$ individual registers, and locking means associated with said register switch for locking said switch into said operate position and for completing said prepared circuit; said locking means comprising an apertured bearing surface secured to said switch and operable therewith between said normal and operate positions, a solenoid provided with a spring biased plunger and a set of plunger operated contacts and mounted in fixed relation to said register switch having said plunger in bearing contact with said bearing surface so that when said switch is in said operate position said plunger is extended and received into an aperture in said bearing surface and said plunger contacts are closed, whereby said register switch is locked in said operate position and said prepared circuit is closed, and means selectively operative for energizing the coil of said solenoid from said source of power in order to withdraw said plunger from said aperture and from bearing contact with said bearing surface, whereby said switch is automatically operated from said operate position to said normal position and said completed circuit is interrupted.

5. In a signalling system including a business machine provided with a plurality of main keys coordinately arranged in M individual ranks and N individual files, a corresponding coordinate arrangement of M different individual first characters in each of N individual files, any one main key in any one of said N individual files of main keys being operative to mark into said machine the one of said individual first characters in said one file corresponding to said one main key, a register switch manually operative from a normal position to an operate position and automatically operative from said operate position to said normal position, primary register means responsive to the marking of any one of said first characters into said machine and controlled thereafter by the operation of said register switch from said normal position to said operate position for registering a one of $M^N$ combinations of N individual first characters in accordance with the one individual first character marked in each of said N individual files of characters and being responsive to the operation of said register switch from said operate position to said normal position for resetting the operated ones of said main keys, calculator means in said machine including a calculator key and responsive to the operation of said calculator key and controlled thereafter by the operation of said register switch into said operate position for making calculations from a plurality of the $M^N$ combinations of N individual first characters registered therein and for marking an individual first character in each of said files thereof in accordance with the calculation, whereby a one of said $M^N$ combinations of N individual first characters corresponding to said calculation is registered in said register means, a plurality of auxiliary keys arranged in files of M individual ranks and respectively corresponding to a plurality of individual second characters, and link mechanism operatively interconnecting said auxiliary keys and said main keys, said mechanism accommodating selective operation of said main keys independently of said auxiliary keys and being responsive to operation of any individual auxiliary key for operating a corresponding individual main key of the same rank of keys; the combination comprising a secondary register provided with a group of $M^N$ individual registers respectively corresponding to said $M^N$ combinations of N individual first characters, means responsive to the registration of one of said $M^N$ combinations of first characters in said machine for preparing a circuit to operate the corresponding one of said $M^N$ individual registers, locking means normally operated in response to the operation of said register switch into said operate position for locking said register switch into said operate position and for completing said prepared circuit, whereby said one individual register is operated, blocking means responsive to the operation of any one of said auxiliary keys for preventing operation of said locking means, whereby a plurality of $M^N$ combinations of N individual first characters may be registered in said machine for calculation purposes, release means responsive to the operation of said calculator key in making a calculation for releasing said blocking means, whereby said locking means is operable thereafter in response to the operation of said register switch for locking said switch and for completing the circuit to operate the one individual register corresponding to said calculation, and restoring means operable for restoring said operated locking means whereby said register switch is automatically operated from said operate position to said normal position and said completed circuit is interrupted.

6. In a signalling system including a business machine provided with a plurality of main keys coordinately arranged in M individual ranks and N individual files, a corresponding coordinate arrangement of M different individual first characters in each of N individual files, any one main key in any one of said N individual files of main keys being operative to mark into said machine the one of said individual first characters in said one file corresponding to said one main key, a register switch manually operative from a normal position to an operate position and automatically operative from said operate position to said normal position, primary register means responsive to the marking of any one of said first characters into said machine and controlled thereafter by the operation of said register switch from said normal position to said operate position for registering a one of $M^N$ combinations of N individual first characters in accordance with the one individual first character marked in each of said N individual files of characters and being responsive to the operation of said register switch from said operate position to said normal position for resetting the operated ones of said main keys, calculator means in said machine including a calculator key and responsive to the operation of said calculator key and controlled thereafter by the operation of said register switch into said operate position for making calculations from a plurality of the $M^N$ combinations of N individual first characters registered therein and for marking an individual first character in each of said files thereof in accordance with the calculation, whereby a one of said $M^N$ combinations of N individual first characters corresponding to said calculation is registered in said register means, a plurality of auxiliary keys arranged in files of M individual ranks, and respectively corresponding to a plurality of individual second characters, and link mechanism operatively interconnecting said auxiliary keys and said main keys, said mechanism accommodating selective operation of said main keys independently of said auxiliary keys and being responsive to operation of any individual auxiliary key for operating a corresponding individual main key of the same rank of keys; the combination comprising a plurality of contact sets coordinately arranged in M individual ranks and N individual files and respectively corresponding to said M individual first characters in each of said N individual files, means responsive to the registration of one of said $M^N$ combinations of N individual first characters in said machine for operating the one of said contact sets in each of said N individual files thereof corresponding to the one of said individual first characters marked in the corresponding individual files of first characters, whereby one of said $M^N$ combinations of N individual contact sets is operated, a secondary register provided with a group of $M^N$ individual registers respectively corresponding to said $M^N$ combinations of individual first characters, a source of power, switching means responsive to the operation of one of said $M^N$ combinations of N individual contact sets for preparing an operating circuit between said source of power and the corresponding one of said $M^N$ individual registers, locking means normally operated in response to the operation of said register switch into said operate position for locking said switch into said operation position and for completing said prepared circuit, whereby said one individual register is operated, blocking means responsive to the operation of any one of said auxiliary keys for preventing operation of said locking means, whereby a plurality of $M^N$ combinations of N individual first characters may be registered in said machine for calculation purposes, release means responsive to the operation of said calculator key in making a calculation for releasing said blocking means, whereby said locking means is operable thereafter in response to the operation of said register switch for locking said switch and for completing the circuit to operate the one individual register corresponding to said calculation, and restoring means operable for restoring said operated locking means whereby said register switch is automatically operated from said operate position to said normal position and said completed circuit is interrupted.

7. In a signalling system including a business machine provided with a plurality of main keys coordinately arranged in M individual ranks and N individual files, a corresponding coordinate arrangement of M different individual first characters in each of N individual files, any one main key in any one of said N individual files of main keys being operative to mark into said machine the one of said individual first characters in said one file corresponding to said one main key, a register switch manually operative from a normal position to an operate position and automatically operative from said operate position to said normal position, primary register means responsive to the marking of any one of said first characters into said machine and controlled thereafter by the operation of said register switch from said normal position to said operate position for registering a one of $M^N$ combinations of N individual first characters in accordance with the one individual first character marked in each of said N individual files of characters and being responsive to the operation of said register switch from said operate position to said normal position for resetting the operated ones of said main keys, calculator means in said machine including a calculator key and responsive to the operation of said calculator key and controlled thereafter by the operation of said register switch into said operate position for making calculations from a plurality of the $M^N$ combinations of N individual first characters registered therein and for marking an individual first character in each of said files thereof in accordance with the calculation, whereby a one of said $M^N$ combinations of N individual first characters corresponding to said calculation is registered in said register means, a plurality of auxiliary keys arranged in files of M individual ranks, and respectively corresponding to a plurality of individual second characters, and link mechanism operatively interconnecting said auxiliary keys and said main keys, said mechanism accommodating selective operation of said main keys independently of said auxiliary keys and being responsive to operation of any individual auxiliary key for operating a corresponding individual main key of the same rank of keys; the combination comprising a plurality of contact sets coordinately arranged in M individual ranks and N individual files and respectively corresponding to said M individual first characters in each of said N individual files, means responsive to the registration of one of said $M^N$ combinations of N individual first characters in said machine for operating the one of said contact sets in each of said N individual files thereof corresponding to the one of said individual first characters marked in the corresponding individual files of first characters, whereby one of said $M^N$ combinations of N individual contact sets is operated, a secondary register provided with a group of $M^N$ individual registers respectively corresponding to said $M^N$ combinations of N individual first characters, a source of power, switching means responsive to the operation of one of said $M^N$ combinations of N individual contact sets for preparing an operating circuit between said source of power and the corresponding one of said $M^N$ individual registers, and control means associated with said switch for selectively locking said switch into said operate position and for completing said prepared circuit; said control means comprising an apertured bearing surface secured to said switch and operable therewith between said normal and operate positions, a solenoid provided with a spring biased plunger and a set of plunger operated contacts and mounted in fixed relation to said register switch having said plunger in bearing contact with said bearing surface so that when said register switch is in said operate position said plunger is extended and received into an aperture in said bearing surface and said plunger contacts are closed, whereby said register switch is locked in said operate position and said prepared circuit is closed, a first circuit completed responsive to the operation of any one of said auxiliary keys for energizing the coil of said solenoid from said source of power in order to retract said plunger from bearing contact with said bearing surface and to prevent locking of said switch, said completed first circuit being interrupted thereafter responsive to the operation of said calculator key in order to re-extend said plunger into bearing contact with said bearing surface so that upon operation of said register switch into said operate position thereafter said register switch is locked in said operate position, and a second circuit including an operate switch for energizing the coil of said solenoid from said source of power in order to withdraw said extended plunger from said aperture and from bearing contact with said bearing surface, whereby said register switch is automatically operated from said operate position to said normal position and said completed circuit is interrupted.

8. The signalling system combination set forth in claim 7 wherein said control means comprises further a relay operated in response to the operation of any one of said auxiliary keys for completing said first circuit and wherein the operation of said calculator key thereafter causes said relay to restore, whereby said completed first circuit is interrupted.

References Cited in the file of this patent

UNITED STATES PATENTS

| | | |
|---|---|---|
| 1,976,600 | Carroll | Oct. 9, 1934 |
| 2,013,012 | Tauschek | Sept. 3, 1935 |
| 2,276,293 | Farmer | Mar. 17, 1942 |
| 2,432,324 | May | Dec. 9, 1947 |
| 2,446,643 | Farmer | Aug. 10, 1948 |
| 2,682,654 | Slocum et al. | June 29, 1954 |

FOREIGN PATENTS

| | | |
|---|---|---|
| 143,103 | Australia | Aug. 29, 1951 |

UNITED STATES PATENT OFFICE
CERTIFICATE OF CORRECTION

Patent No. 2,936,111                                May 10, 1960

Paul H. Bindel

It is hereby certified that error appears in the printed specification of the above numbered patent requiring correction and that the said Letters Patent should read as corrected below.

Column 19, line 39, for "of individual" read -- of N individual --; line 47, for "operation" read -- operate --.

Signed and sealed this 1st day of November 1960.

(SEAL)
Attest:

KARL H. AXLINE                                ROBERT C. WATSON
Attesting Officer                              Commissioner of Patents